United States Patent
Sano (10) Patent No.: US 7,760,000 B2
(45) Date of Patent: Jul. 20, 2010

(54) CLOCK GENERATOR

(75) Inventor: Masaki Sano, Kanagawa (JP)

(73) Assignee: NEC Electronics Corporation, Kawasaki, Kanagawa (JP)

(*) Notice: Subject to any disclaimer, the term of this patent is extended or adjusted under 35 U.S.C. 154(b) by 89 days.

(21) Appl. No.: 12/149,564

(22) Filed: May 5, 2008

(65) Prior Publication Data

US 2008/0290925 A1 Nov. 27, 2008

(30) Foreign Application Priority Data

May 22, 2007 (JP) .............................. 2007-134918

(51) Int. Cl.
*G06F 1/04* (2006.01)
(52) U.S. Cl. .................... 327/293; 327/295; 331/57
(58) Field of Classification Search ............... 327/291, 327/293, 298, 295–297; 331/57
See application file for complete search history.

(56) References Cited

U.S. PATENT DOCUMENTS

| 5,180,994 | A | * | 1/1993 | Martin et al. ................. 331/38 |
| 5,548,251 | A | * | 8/1996 | Chou et al. .................... 331/57 |
| 6,271,732 | B1 | * | 8/2001 | Herzel .......................... 331/57 |
| 6,388,492 | B2 | * | 5/2002 | Miura et al. ................. 327/291 |
| 6,775,217 | B1 | * | 8/2004 | Kato et al. ................. 369/59.2 |

FOREIGN PATENT DOCUMENTS

| JP | 07-007397 | 1/1995 |
| JP | 10-335991 | 12/1998 |
| JP | 2000-156629 | 6/2000 |
| JP | 2002-141785 | 5/2002 |
| JP | 2006-294131 | 10/2006 |
| WO | WO2006/030905 A1 | 3/2006 |

OTHER PUBLICATIONS

Japenese Office Action dated Apr. 7, 2009 with a partial English-Language translation.

* cited by examiner

*Primary Examiner*—Lincoln Donovan
*Assistant Examiner*—Hai L Nguyen
(74) *Attorney, Agent, or Firm*—McGinn IP Law Group, PLLC

(57) ABSTRACT

A multiphase clock with high resolution is generated. A first clock generator circuit (120) includes n level converters BUFs that conduct level conversion on two input signals, and generate a pair of pulse signals that switch the levels with reference to a crossing point at which the two signal are identical in level with each other. An i-th BUF in the first clock generator circuit (120) inputs a one-side output pair that is respective one-side outputs of the differential outputs of two i-th ($1 \leq i \leq n$) and (i+1)-th (1 when i=n) differential circuits in a ring oscillator 110 in which n differential circuits DCELs having differential inputs and outputs are connected in a ring configuration. The one-side output pair is two one-side outputs that are input to the noninverting terminal of the next differential circuit, or the two one-side outputs that are input to the inverting terminal of the next differential circuit.

20 Claims, 6 Drawing Sheets

CLOCK GENERATOR

BACKGROUND OF THE INVENTION

1. Field of the Invention

The present invention relates to a clock generation technique, and more particularly, to a technique of generating a plurality of clocks that are different in phase from each other.

2. Description of the Related Art

In recent years, there has spread an information recording device which irradiates an optical disc medium such as a compact disc (CD) or a digital versatile disc (DVD) with a laser beam that is emitted according to a recording pulse signal (recording clock) which is generated by a phase locked loop (PLL) circuit to record information. In the actual recording operation of the information recording device, in order to determine a recording position on an optical disc with a high precision, a cycle shorter than a cycle of the recording clock, for example, a clock of 1/16 or 1/32 of the cycle of the recording clock is used, and a higher recording quality is obtained as the cycle is shorter, that is, the resolution is higher.

There have been proposed various techniques for obtaining the clock that is high in resolution. For example, JP2006-294131 A discloses a technique of shifting the phase of the reference clock little by little to generate a multiphase clock. Although JP 2006-294131 A fails to suggest how to shift the phase of the reference clock, there is assumed that a plurality of differential circuits that are sequentially connected to each other are used. According to the technique, it is possible to obtain the resolution corresponding to the amount of delay of one differential circuit.

Also, there has been known a technique of using a multiphase clock consisting of outputs of the respective stages of a ring oscillator that is normally used in a voltage controlled oscillator (VCO) of a PLL circuit. For example, JP 2000-156629 A discloses a technique of obtaining a clock output having a resolution higher than the amount of delay of n (n is an integer of 2 or larger) differential circuits by the aid of a first ring oscillator and a second ring oscillator having the differential circuits connected in a ring configuration. In the technique, the output of an i-th (1≦i≦n) differential circuit of the second ring oscillator is phase-coupled with the output of an i-th differential circuit of the first ring oscillator, and the output of the i-th (1≦i≦n) differential circuit of the second ring oscillator is phase-coupled with the output of an (i+1)-th (1 when i=n) differential circuit of the first ring oscillator. With the above configuration, the output signal of the i-th differential circuit of the second ring oscillator has an intermediate phase between the phases of the outputs of the i-th differential circuit and the (i+1)-th differential circuit in the first ring oscillator. That is, the first ring oscillator and the second ring oscillator maintain oscillations in a state where their phases are temporally shifted by ½ of the amount of delay of the differential circuits that constitute the first ring oscillator and the second ring oscillator. As a result, a time interval of the phase state during the oscillation becomes as fine as ½ of the amount of delay of the differential circuits, thereby making it possible to increase the resolution of the oscillator circuit to twice of a limit that is determined by the amount of delay of the differential circuits.

Figure 5:
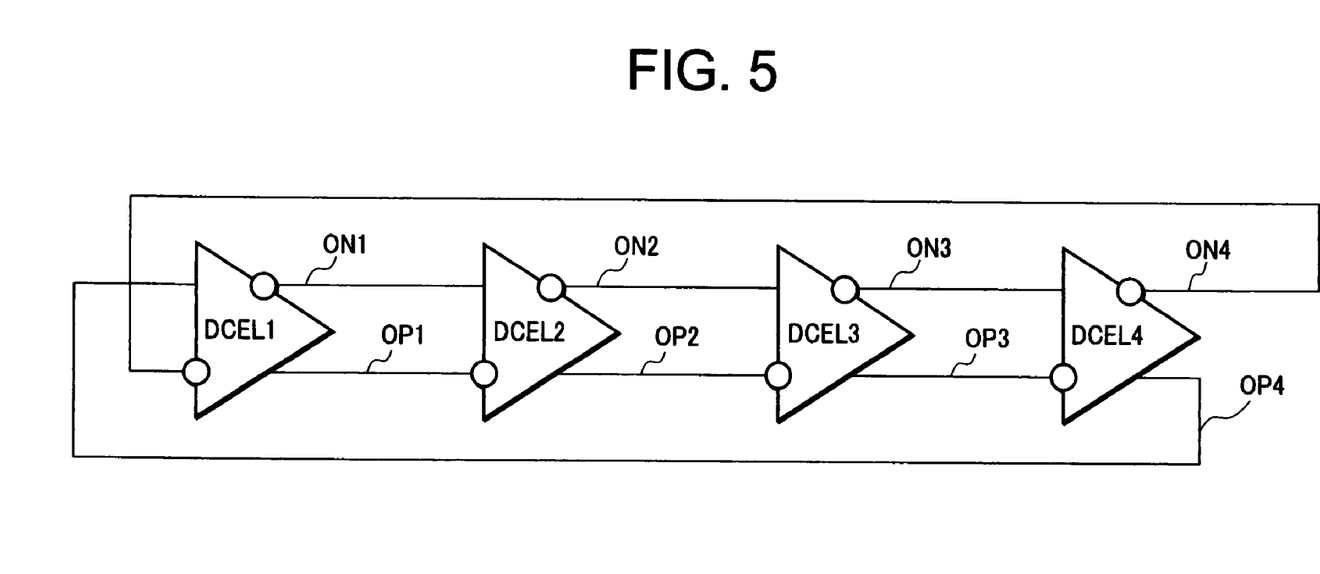
FIG. 5 is a diagram showing an example of the ring oscillator that is constituted by the differential circuits having differential inputs and outputs.

There has been known the ring oscillator of VCO which is made up of differential circuits having differential input and output. FIG. 5 shows an example of the ring oscillator in which the four differential circuits DCELs (DCEL1 to DCEL4) are disposed. Each of the DCELs inverts the phase of a pair of input signals that are differential outputs of a previous DCEL, and outputs the inverted signals to a next DCEL with a delay of a given time (delay amount t). In the ring oscillator, the differential input and the differential output of each DCEL have the same cycle T (in the example shown, the cycle T is "8×t" because the number of DCELs is four).

When the above ring oscillator is designed in such a manner that the differential outputs of the respective DCELs are converted in level by the aid of a level converter to obtain the clock signal, the multiphase clock can be obtained.

Figure 6:
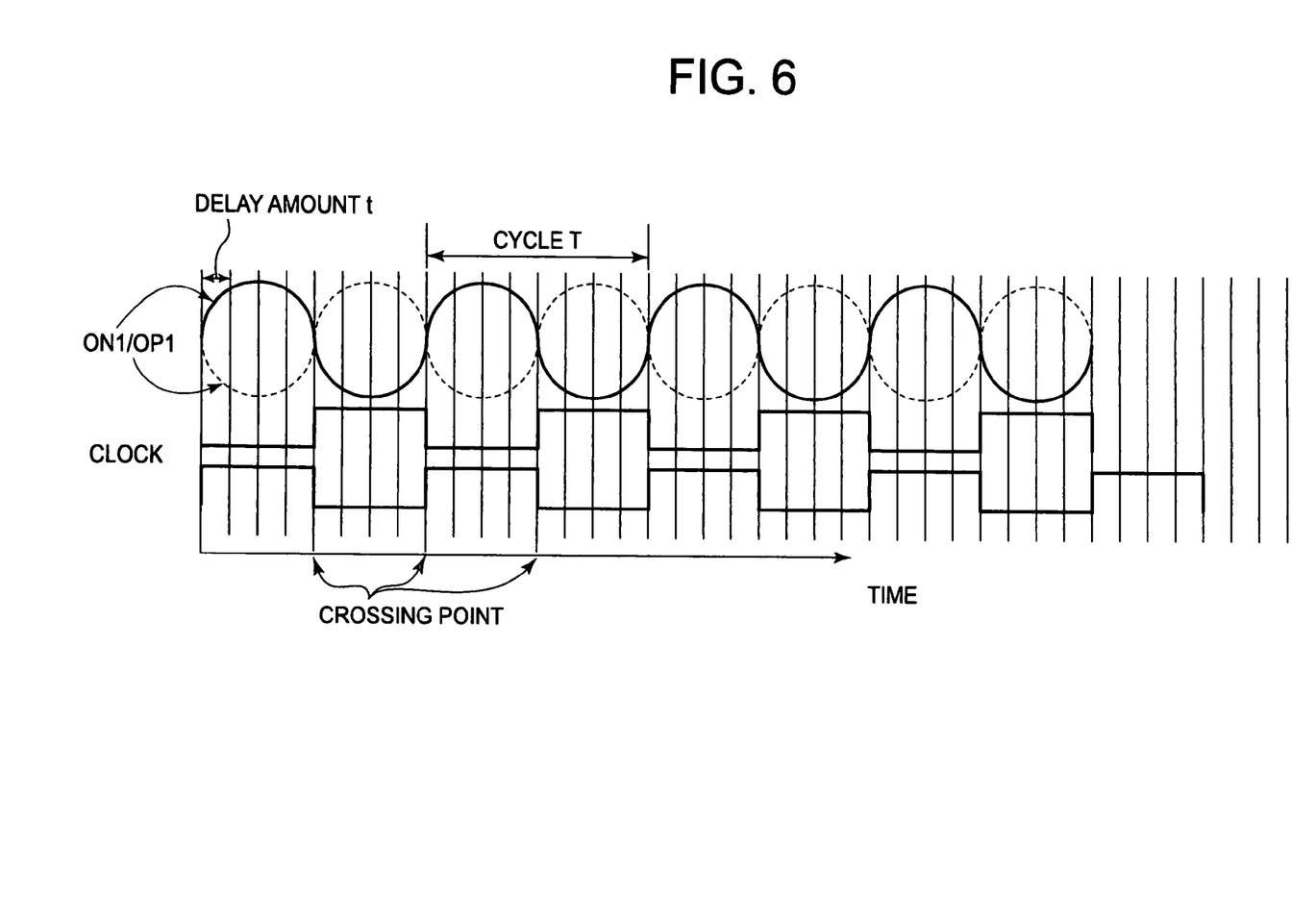
FIG. 6 is a diagram for explaining a method of generating the multiphase clocks by the aid of the outputs of the respective differential circuits in the ring oscillator shown in FIG. 5.

FIG. 6 shows a clock that can be obtained by subjecting the differential outputs ON1 and OP1 of the DCEL1 and clocks that can be obtained by converting the differential outputs ON1 and OP1 in level. As shown in the figure, ON1 and OP1 are a pair of sine waves that are opposite in phase to each other, and have the same level and cross each other at a point of "T×½". As a result of converting the levels of ON1 and OP1, a pair of clocks that are opposite in phase to each other can be obtained, and those clocks switch their levels at a point (crossing point) where ON1 and OP1 cross each other.

Likewise, when the levels of ON2 and OP2, ON3 and OP3, and ON4 and OP4 are converted, respectively, the clocks shown in FIG. 6 can be obtained from the differential outputs of the respective DCELs. Since the outputs of the respective DCELs are sequentially delayed by the delay amount t, the clocks that are obtained by converting the differential outputs of the respective DCELs in level are also sequentially shifted in phase by the delay amount t. The clocks of eight phases can be generated from the outputs of the respective DCELs of the ring oscillator shown in FIG. 5 in the above manner.

The multiphase clocks that are generated by converting the levels of the outputs of the respective DCELs of the ring oscillator which is constituted by the DCELs having the differential inputs and outputs as shown in FIG. 5 are sequentially shifted in phase by the delay amount t of the DCELs, thereby making it impossible to obtain the resolution that is equal to or higher than a resolution corresponding to the delay amount t of the DCELs. In order to obtain the resolution that is equal to or higher than the resolution corresponding to the delay amount t of the DCELs, it is necessary to generate a clock having a phase between the phases of clocks which are generated from the outputs of two adjacent DCELs.

SUMMARY

One aspect of the present invention resides in a clock generator. The clock generator includes: a ring oscillator having a plurality of differential circuits coupled together in a series, each differential circuit having a differential input and a differential output, the differential output of one circuit being coupled to the differential input of a next one of the circuits in the plurality of circuits, the plurality of circuits having a first circuit and a last circuit, the differential output of the last circuit being coupled to the differential input of the first circuit, the plurality of circuits including an even subplurality of differential circuits and an odd subplurality of differential circuits alternately coupled with each other in the series, the plurality of differential circuits arranged and configured to produce an odd number of inversions of a signal in one pass through the plurality of differential circuits; and a level converter receiving two input signals, generating an output signal and providing a characteristic between the output signal and a difference between the two input signals, the characteristic having an odd function being geometrically symmetric with respect to a crossing point of same level between the two input signals, one of the two input signals revealed to the output from one of the differential circuits of the odd subplurality, the other one of the two input signals revealed to the output from one of the differential circuits of the even subplurality.

The above clock generator can be replaced and represented by a device, a method, or a system, which is effective as other aspects of the present invention.

According to the technique of the present invention, when the multiphase clocks are generated by the aid of the outputs of the respective DCELs in the ring oscillator that is constituted by the DCELs having the differential inputs, it is possible to generate a clock having a phase between the phases of clocks which are generated from the outputs of two adjacent DCELs.

DETAILED DESCRIPTION OF THE PREFERRED EMBODIMENT

Figure 1:
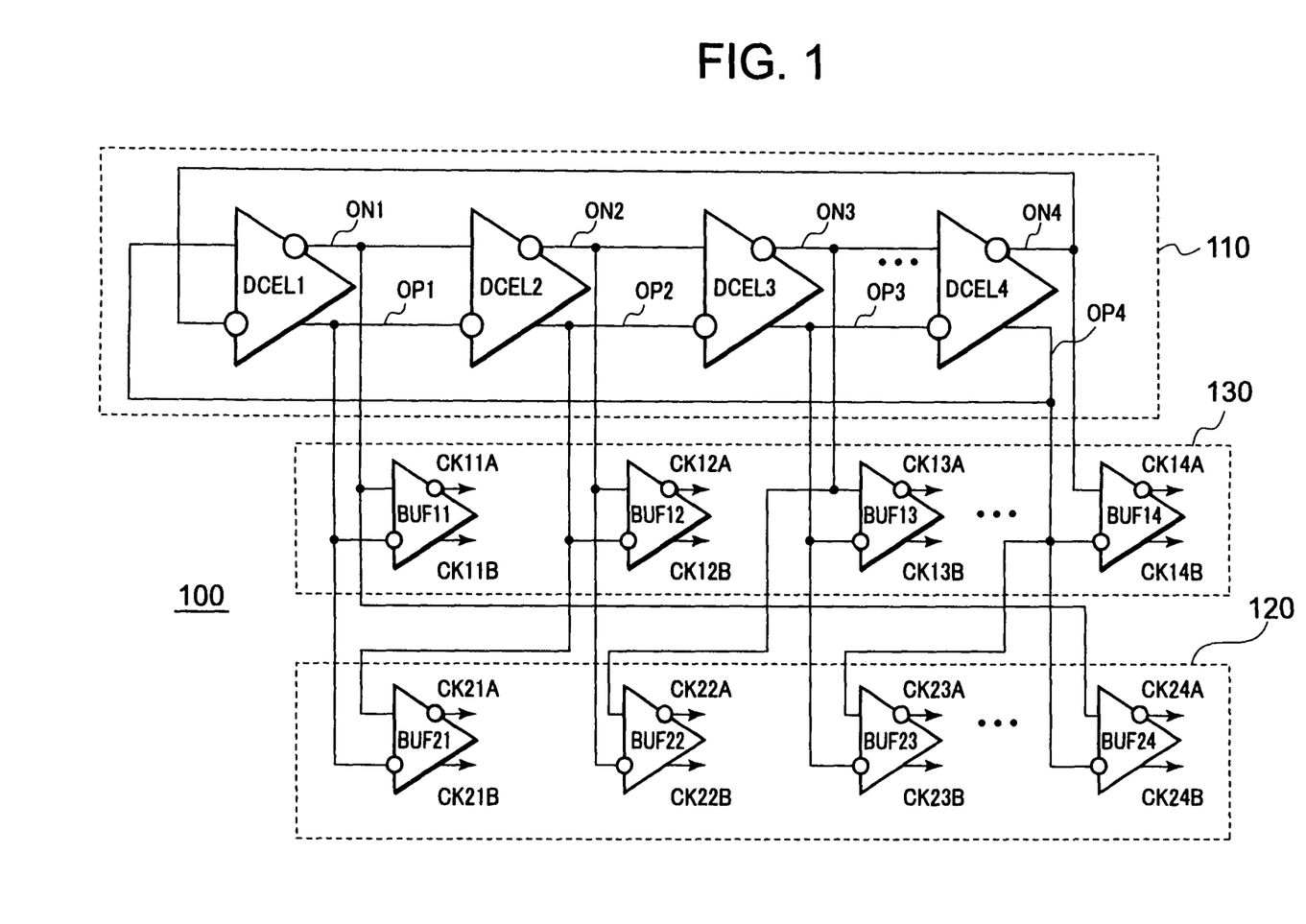
FIG. 1 is a diagram showing a clock generator according to an embodiment of the present invention.

FIG. 1 is a clock generator 100 according to an embodiment of the present invention. The clock generator 100 includes a ring oscillator 110, a first clock generator circuit 120, and a second clock generator circuit 130.

The ring oscillator 110 is a ring oscillator used for a VCO of a PLL circuit, and in the ring oscillator 110, a plurality of, in this example, four differential circuits DCELs (DCEL1 to DCEL4) are connected in a ring configuration, and each of the differential circuits DCELs has a differential input and a differential output.

The second clock generator circuit 130 includes four level converters BUFs (BUF11 to BUF14) that input the outputs (differential outputs) of the respective DCELs in the ring oscillator 110, respectively, and conduct level conversion on the input signals to generate and output a pair of pulse signals (clocks).

Similarly, the first clock generator circuit 120 also has four level converters BUFs (BUF21 to BUF24), and each of the BUFs inputs the respective one of the differential outputs of two adjacent DCELs in the ring oscillator 110, and conducts level conversion on the input signals to generate and output a pair of clocks.

In the ring oscillator 110, the DCEL1 inverts the phases of signals that are input to a noninverting terminal and an inverting terminal, respectively, and outputs differential signals ON1 and OP1 with a delay of a given period (delay amount t). The signal ON1 corresponds to a signal that is input to the noninverting terminal of the DCEL1, and the signal OP1 corresponds to a signal that is input to the inverting terminal of the DCEL1. In the following description, in the input and output of the DCEL, the signal that is input to the noninverting terminal is called "noninverting input", and an output signal corresponding to the input signal is called "noninverting output". Also, the signal that is input to the inverting terminal is called "inverting input", and an output signal corresponding to the input signal is called "inverting output".

The noninverting output ON1 of the DCEL1 is input to the noninverting terminal of the DCEL2, and inverted and delayed by the DCEL2 to generate ON2 which is input to the noninverting terminal of the DCEL3 as the noninverting output of the DCEL2. Then, ON2 is input to the noninverting terminal of the DCEL3 and inverted and delayed by the DCEL3 to generate ON3 which is input to the noninverting terminal of the DCEL4 as the noninverting output of the DCEL3.

The inverting output OP1 of the DCEL1 is input to the inverting terminal of the DCEL2, and inverted and delayed by the DCEL2 to generate OP2 which is input to the inverting terminal of the DCEL3 as the inverting output of the DCEL2. Then, the OP2 is input to the inverting terminal of the DCEL3 and inverted and delayed by the DCEL3 to generate OP3 which is input to the inverting terminal of the DCEL4 as the inverting output of the DCEL3.

The DCEL 4 inverts and delays the phase of the noninverting input ON3 to obtain the noninverting output ON4, and also inverts and delays the inverting input OP3 to obtain the inverting output OP4. The noninverting output ON4 and the inverting output OP4 of the DCEL4 are input to the inverting terminal and the noninverting terminal of the DCEL1, respectively. The respective DCELs have the same delay amount t.

Figure 2:
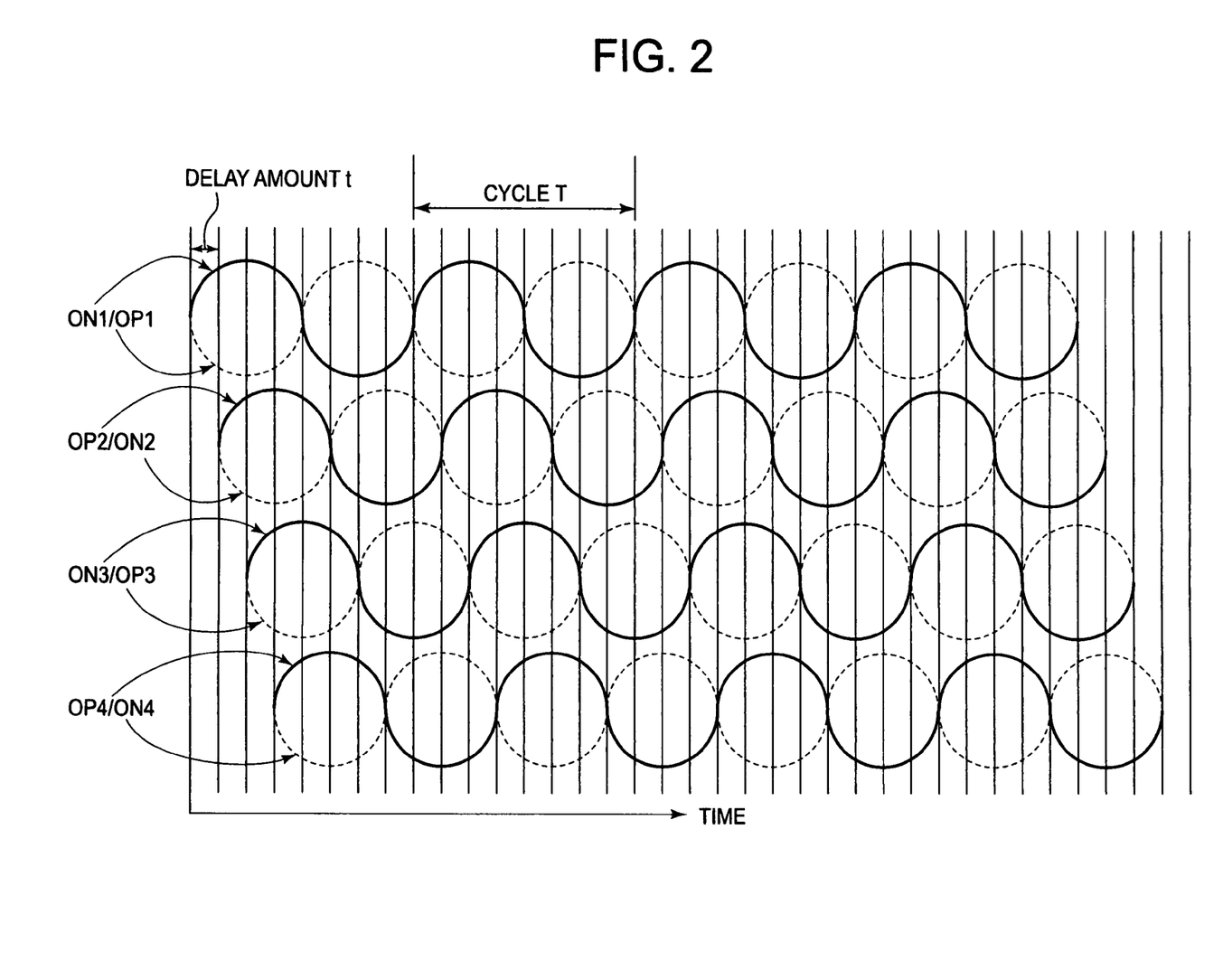
FIG. 2 is a diagram showing the outputs of respective differential circuits of a ring oscillator in the clock generator shown in FIG. 1.

FIG. 2 shows outputs from the respective differential circuits of the ring oscillator 110. One scale in a time axial direction in the figure indicates the delay amount t of the DCEL. As shown in the figure, the output of each of the DCELs is generated by inverting in phase and delaying by the delay amount t with respect to the output of the previous DCEL, and the cycle of the output signals from the respective DCELs has the same T. The cycle T is equal to eight times as large as the delay amount t.

The BUF11 to BUF14 in the second clock generator circuits input the ON1/OP1 to ON4/OP4 shown in FIG. 2, respectively, and conduct level conversion on the ON1/OP1 to ON4/OP4. Since the respective BUFs conduct the same operation except that the input signals are different, the BUF11 and BUF12 will be exemplified with reference to FIG. 3. The respective BUFs that conduct the level conversion generate a pair of pulse signals that switch the levels on the basis of a point (crossing point) at which the two input signals become identical with each other in level, and a distance between the point at which the level switches and the crossing point depends on the amount of delay of the BUF. In the following description and drawing, for facilitation of understanding the main feature of the present invention, the delay of the BUF is omitted, and the each of the BUFs generate a pair of pulse signals that switch the levels at the crossing point of the two input signals.

Figure 3:
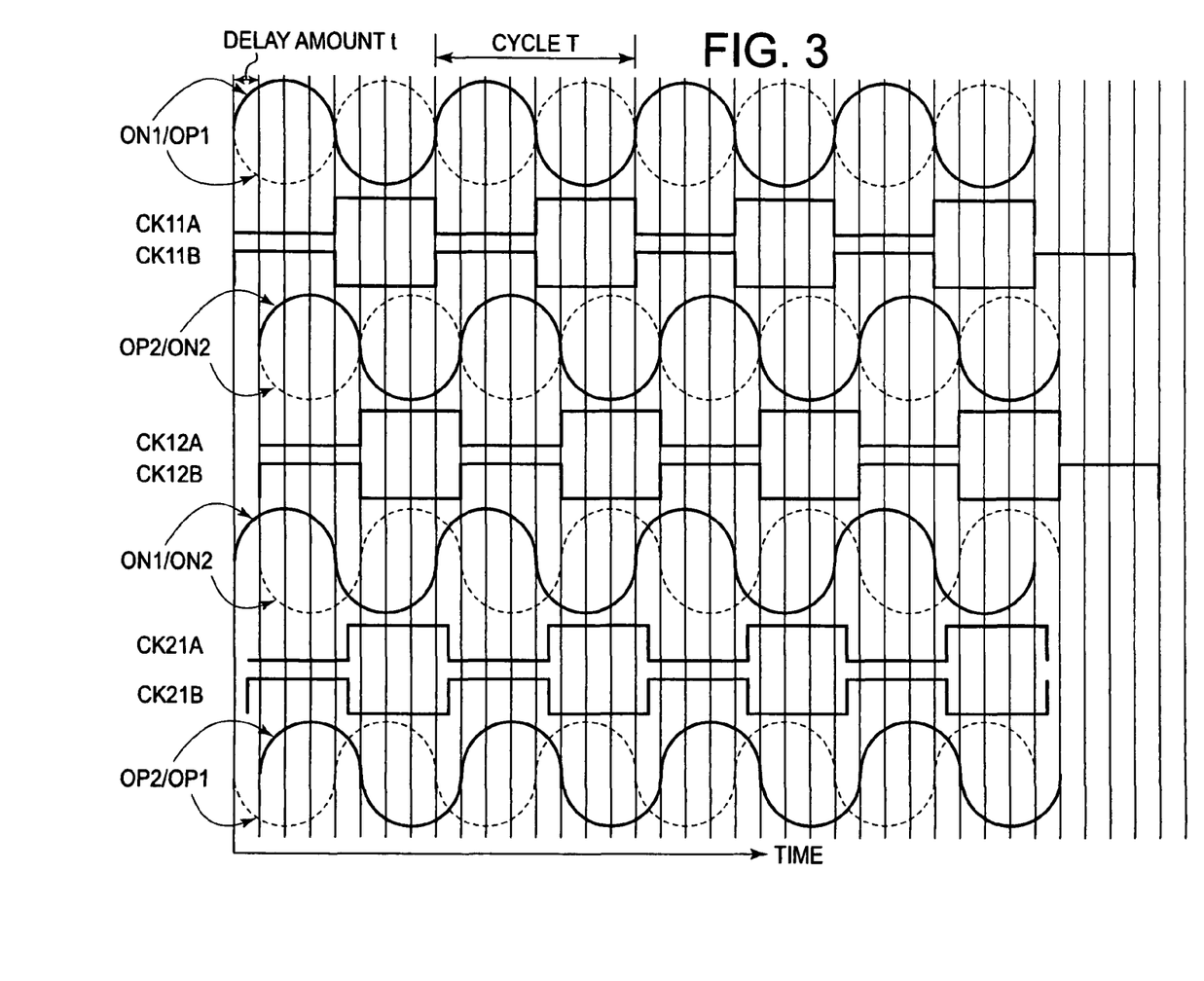
FIG. 3 is a diagram for explaining a first clock generator circuit and a second clock generator circuit in the clock generator shown in FIG. 1.

The BUF11 inputs the noninverting output ON1 and the inverting output OP1 of the DCEL1, and conducts the level conversion on the input signals to obtain output signals indicated by CK11A and CK11B in FIG. 3. The CK11A and the CK11B are a pair of clocks that are opposite in phase to each other, and the levels of the CK11A and the CK11B switch at the crossing point of the ON1 and OP1. Since the ON1 and the OP1 have the same cycle T and the phases opposite to each other, the ON1 and the OP1 cross each other and become identical in the level with each other at the points of the integer multiple of "T×½". Accordingly, CK11A and CK11B have the cycle T, and switch the level at the points of the integer multiple of "T×½".

The BUF12 inputs the noninverting output ON2 and the inverting output OP2 of the DCEL2, and conducts the level conversion on the input signals to obtain output signals indicated by CK12A and CK12B in FIG. 3. The CK12A and the CK12B are a pair of clocks that are opposite in phase to each other, and the levels of the CK12A and the CK12B switch at the crossing point of the ON2 and OP2.

As is understood from FIG. 3, the four clocks CK11A, CK11B, CK12A, and CK12B have the same cycle, the CK11A and the CK11B are opposite in phase to each other, and the CK12A and the CK12B are opposite in phase to each other. Also, the CK12A is delayed from the CK11A by the delay amount t, and the CK12B is delayed from the CK12A by the delay amount t.

Also, although being not shown in FIG. 3, the BUF13 and the BUF14 also conduct the level conversion on the ON3 and the OP3, and the ON4 and the OP4, respectively to obtain the clocks CK13A and CK13B, and the clocks CK14A and CK14B. The CK13A and the CK13B are opposite in phase to each other, and the CK14A and the CK14B are opposite in phase to each other. Also, the CK13A is delayed from the CK12A by the delay amount t, and the CK14A is delayed from the CK13A by the delay amount t. Likewise, the CK13B is delayed from the CK12B by the delay amount t, and the CK14B is delayed from the CK13B by the delay amount t.

That is, the second clock generator circuit 130 can obtain the clocks of eight phases in total, and has the resolution corresponding to the delay amount t of the DCEL in the ring oscillator 110.

A relationship between the outputs of the two adjacent DCELs in the ring oscillator 110 will be described before the first clock generator circuit 120 will be described in detail. In this example, the DCEL1 and DCEL2 will be described.

As has been described above, because the ON1 and the OP1 have the same cycle T and are opposite in phase to each other, the ON1 and the OP1 cross each other at the points of the integer multiple of "T×½". On the other hand, as shown by "the ON1 and the ON2" in FIG. 3, because the noninverting output ON2 of the DCEL2 is a signal obtained by inverting the noninverting output ON1 of the DCEL1 and delaying the inverted noninverting output ON1 by the delay amount t, the ON2 and the ON1 cross each other at the points of "an integer multiple of (T×½)+t×½".

Likewise, as shown by "the OP2 and the OP1" in FIG. 3, because the inverting output OP2 of the DCEL2 is a signal obtained by inverting the inverting output OP1 of the DCEL1 and delaying the inverted inverting output OP1 by the delay amount t, the OP2 and the OP1 cross each other at the points of "an integer multiple of (T×½)+t×½".

Also, although being not shown in FIG. 3, because the noninverting output ON3 of the DCEL3 is a signal obtained by inverting the noninverting output ON2 of the DCEL2 and delaying the inverted noninverting output ON2 by the delay amount t, the ON3 and the ON2 cross each other at the points of "an integer multiple of (T×½)+t×3/2". The same is applied to the inverting output OP3 of the DCEL3 and the inverting output OP2 of the DCEL2.

Likewise, the noninverting output ON4 of the DCEL4 and the noninverting output ON3 of the DCEL3, or the inverting output OP4 of the DCEL4 and the inverting output OP3 of the DCEL3 cross each other at the point of "an integer multiple of (T×½)+t×5/2".

The noninverting output ON4 of the DCEL4 is input to the inverting terminal of the next DCEL1, and the inverting output OP4 is input to the noninverting terminal of the DCEL1. For that reason, the noninverting output ON1 of the DCEL1 and the inverting output OP4 of the DCEL4, or the inverting output OP1 of the DCEL1 and the noninverting output ON4 of the DCEL4 cross each other at the point of "an integer multiple of (T×½)+t×7/2".

The first clock generator circuit 120 will be described given the above relationship between the outputs of the two adjacent DCELs in the ring oscillator 110.

The first clock generator circuit 120 also has four level converters BUFs (BUF21 to BUF24), and each of the BUFs has the same function as that of the respective BUFs in the second clock generator circuit 130.

The BUF21 inputs the inverting output OP2 of the DCEL2 and the inverting output OP1 of the DCEL1 to generate a pair of clocks CK21A and CK21B that are opposite in phase to each other. Because the OP2 and the OP1 cross each other at the points of "an integer multiple of (T×½)+t×½", as shown in FIG. 3, the CK21A and the CK21B switch the levels at the points of "an integer multiple of (T×½)+t×½".

As is understood from the comparison of the clock CK21A that is output by the BUF21 with the clock CK11A that is output by the BUF11, the CK21A is delayed from the CK11A by "t×½". Also, the CK21B is delayed from the CK11B by "t×½".

The BUF22 inputs the noninverting output ON3 of the DCEL3 and the noninverting output ON2 of the DCEL2 to generate a pair of clocks CK22A and CK22B that are opposite in phase to each other. As described above, because the ON3 and the ON2 cross each other at the points of "an integer multiple of (T×½)+t×3/2", the CK22A and the CK22B switch the levels at the points of "an integer multiple of (T×½)+t×3/2".

That is, the clock CK22A that is output by the BUF22 is delayed from the clock CK21A that is output by the BUF21 by the delay amount t, and the CK22B is also delayed from the CK21B by the delay amount t.

The BUF23 inputs the inverting output OP4 of the DCEL4 and the inverting output OP3 of the DCEL3 to generate a pair of clocks CK23A and CK23B that are opposite in phase to each other. As described above, because the OP4 and the OP3 cross each other at the points of "an integer multiple of (T×½)+t×5/2", the CK23A and the CK23B switch the levels at the points of "an integer multiple of (T×½)+t×5/2".

That is, the clock CK23A that is output by the BUF23 is delayed from the clock CK22A that is output by the BUF22 by the delay amount t, and the CK23B is also delayed from the CK22B by the delay amount t.

The BUF24 inputs the noninverting output ON1 of the DCEL1 and the inverting output OP4 of the DCEL4 to generate a pair of clocks CK24A and CK24B that are opposite in phase to each other. As described above, because the ON1 and the OP4 cross each other at the points of "an integer multiple of (T×½)+t×7/2", the CK24A and the CK24B switch the levels at the points of "an integer multiple of (T×½)+t×7/2".

That is, the clock CK24A that is output by the BUF24 is delayed from the clock CK23A that is output by the BUF23 by the delay amount t, and the CK24B is also delayed from the CK23B by the delay amount t.

The first clock generator circuit 120 obtains the clocks of eight phases in total. Since the second clock generator circuit 130 also obtains the clocks of eight phases in total, the clock generator 100 generates the clocks of 16 phases in total.

Figure 4:
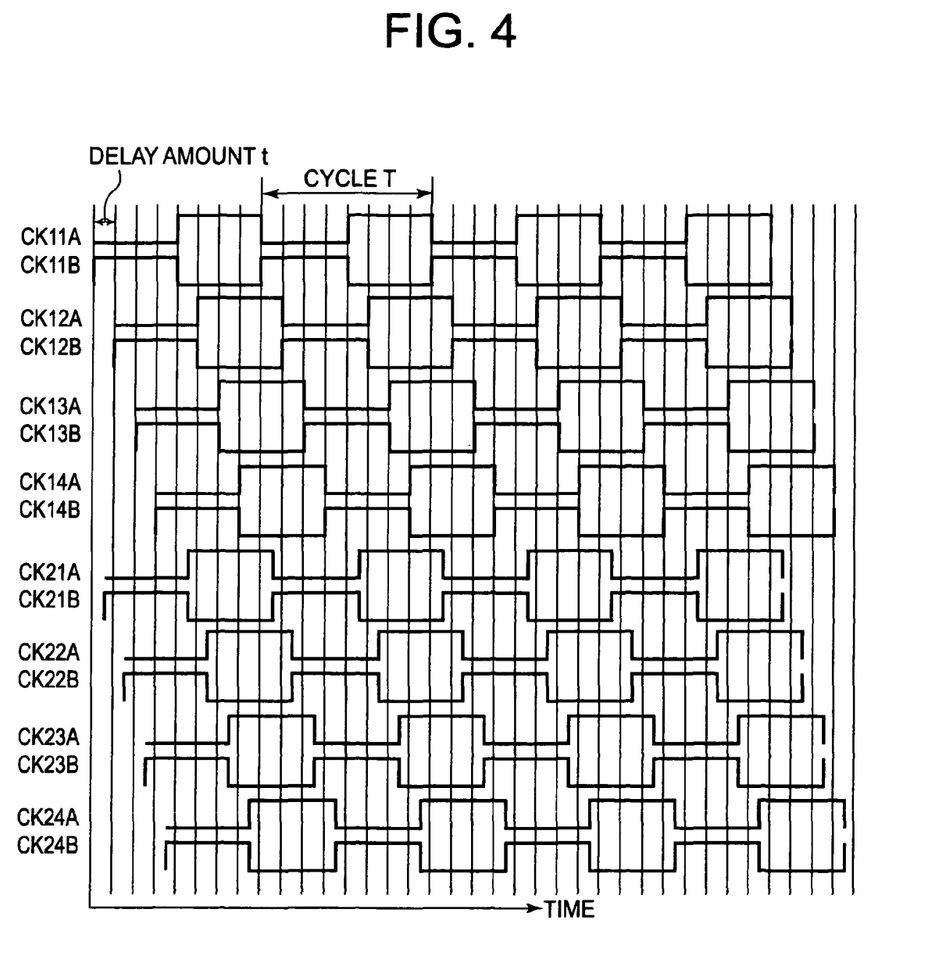
FIG. 4 is a diagram showing multiphase clocks that are generated by the clock generator shown in FIG. 1.

FIG. 4 shows the clocks of 16 phases which are generated by the clock generator 100. The clocks of eight phases (CK11A/CK11B to CK14A/CK14B) of an upper portion of FIG. 4 are generated by the second clock generator circuit 130, and the clocks of eight phases (CK21A to CK24A and CK21B to CK24B) of a lower portion are generated by the first clock generator circuit 120. The CK11A, CK21A, CK12A, CK22A, CK13A, CK23A, CK14A, and CK24A are sequentially delayed by "delay amount t×½", and CK11B, CK21B, CK12B, CK22B, CK13B, CK23B, CK14B, and CK24B that are inverting signals of CK11A, CK21A, CK12A, CK22A, CK13A, CK23A, CK14A, and CK24A, respectively, are also sequentially delayed by "delay amount t×½". That is, the clock generator 100 shown in FIG. 1 obtains the resolution corresponding to ½ of the delay amount t of the DCELs that constitute the ring oscillator 110.

As described above, in the clock generator 100 according to this embodiment, the level converters BUFs of the first clock generator circuit 120 input the respective one of the differential outputs of the two adjacent DCELs in the ring oscillator 110 and conduct the level conversion on the input signals, to thereby obtain the clocks having the intermediate phase of the clock which is obtained by the two level converters BUF in the second clock generator circuit 130 which input the differential outputs of the two DCELs, respectively, to conduct the level conversion on the input signals. Accordingly, it is possible to realize the resolution of twice as large as the resolution corresponding to the delay amount t of the differential circuits in the ring oscillator 110.

In the structure that input the respective outputs in the ring oscillator that is constituted by the DCELs having the differential inputs and outputs, and conduct the level conversion on the input signals, in order to obtain the same resolution as that of the clock generator in the embodiment shown in FIG. 1, it is necessary to design the amount of delay of the DCELs in half. In order to halve the amount of delay of the DCELs, it is necessary to at least double the current that drives the DCELs, which is disadvantageous from the viewpoint of the current consumption. On the contrary, in this embodiment, the first clock generator circuit 120 that is constituted by the level converters that are smaller in the current consumption than the DCELs is added to realize the high resolution. As a result, it is possible to suppress the current consumption.

Also, in the method disclosed in JP2000-156629A, in order to obtain the resolution that is equal to or higher than a limit resolution which is determined by the amount of delay of the differential circuits, it is necessary that the output of the i-th ($1 \leq i \leq n$) differential circuit of the second ring oscillator which is referred to in JP 2000-156629 A is combined in phase with the output of the i-th differential circuit of the first ring oscillator to take synchronization, which is complicated in circuit. On the contrary, the clock generator according to the present invention can realize the high resolution with the simple circuit structure.

The present invention has been described above with reference to the embodiment. The embodiment is exemplary, and various changes, increase/decrease, or combination may be made with respect to the embodiment described above without departing from the scope of the invention. It would be obvious by the ordinary skilled men that modified examples that are subjected to the changes, increase/decrease, or combination also fall within the scope of the present invention.

For example, in the clock generator 100 according to the embodiment shown in FIG. 1, as an example, the ring oscillator 110 has a four-stage configuration, and the first clock generator circuit 120 and the second clock generator circuit 130 also have the four-stage configuration in correspondence with the ring oscillator 110. However, the number of ring oscillator and the number of respective clock output circuits are not limited to four, but can be an arbitrary number of 2 or larger.

Also, in the clock generator 100 according to the embodiment shown in FIG. 1, the BUF21 in the first clock generator circuit 120 inputs the noninverting output ON2 of the DCEL2 and the noninverting output ON1 of the DCEL1. Alternatively, the BUF21 can input the inverting output OP2 of the DCEL2 and the inverting output OP1 of the DCEL1. That is, the respective BUFs in the first clock generator circuit 120 can input the two one-side outputs of the differential outputs of the corresponding i-th (i is an integer of 1 or larger) stage and (i+1)-th (1 when i=4, and so on) stage, which are input to the noninverting terminals of the next DCEL, respectively, or can be input the two one-side outputs that are input to the next inverting terminal, respectively.

What is claimed is:

1. A clock generator comprising:
   a ring oscillator including a plurality of differential circuits coupled together in a series, each differential circuit including a differential input and a differential output, a differential output of one circuit being coupled to a differential input of a next one of said circuits in said plurality of circuits, said plurality of circuits including a first circuit and a last circuit, said a differential output of said last circuit being coupled to a differential input of said first circuit, said plurality of circuits comprising an even numbered subplurality of differential circuits and an odd numbered subplurality of differential circuits alternately coupled with each other in said series, said plurality of differential circuits arranged and configured to produce an odd number of inversions of a signal in one pass through said plurality of differential circuits; and
   a level converter receiving two input signals, generating an output signal, and providing a characteristic between said output signal and a difference between said two input signals, said characteristic having an odd function being geometrically symmetric with respect to a crossing point of same level between said two input signals, one of said two input signals revealed to said output from one of said differential circuits of said odd numbered subplurality of differential circuits, the other one of said two input signals revealed to said output from one of said differential circuits of said even numbered subplurality of differential circuits.

2. The clock generator according to claim 1, wherein the ring oscillator includes a differential input pair of lines provided on said input of each delay circuit and a differential output pair of lines provided on said output of each said delay circuit, said differential output pair of lines provided on one circuit being cascadedly coupled to said differential input pair of lines provided on a next one of said circuits in said plurality of circuits.

3. The clock generator according to claim 2, wherein the one of said two input signals is revealed to one of said output pair of lines provided on said output from one of said differential circuits of said odd numbered subplurality of differential circuits and the other one of said two input signals is revealed to one of said output pair of lines provided on said output from one of said differential circuits of said even numbered subplurality of differential circuits.

4. The clock generator according to claim 3, wherein the one of said differential circuits of said odd numbered subplurality is sequentially adjacent to the one of said differential circuits of said even numbered subplurality.

5. The clock generator according to claim 2, wherein a number of said circuits comprising said plurality of differential circuits is an even number.

6. The clock generator according to claim 5, wherein the differential output pair of lines provided on said output of said last circuit is cross-coupled to the differential input pair of lines provided on said input of said first circuit to arrange and configure to produce an odd number of inversions of a signal in one pass through said plurality of differential circuits.

7. The clock generator according to claim 6, wherein the one of said two input signals is revealed to its one of said differential output pair of lines provided on said output of said last circuit and the other one of said two input signals is revealed to its other one of said differential output pair of lines provided on said input of said first circuit.

8. The clock generator according to claim 2, wherein a number of said circuits comprising said plurality of differential circuits is an odd number.

9. The clock generator according to claim 8, wherein the differential output pair of lines provided on said output of said last circuit is cascadedly coupled to the differential input pair of lines provided on said input of said first circuit to arrange and configure to produce an odd number of inversions of a signal in one pass through said plurality of differential circuits.

10. The clock generator according to claim 9, wherein the one of said two input signals is revealed to its one of said differential output pair of lines provided on said output of said last circuit and the other one of said two input signals is revealed to its one of said differential output pair of lines provided on said input of said first circuit.

11. A clock generator comprising:
a ring oscillator including a plurality of inverting delay circuits coupled together in a cascaded series, each delay circuit including an input and an output, said output of one delay circuit coupled to said input of a next sequential one of said delay circuits, said plurality of delay circuits comprising a cascaded series, said cascaded series including a first delay circuit and a last delay circuit, said last delay circuit having its output coupled to said input of said first delay circuit, said cascaded series of delay circuits comprising an odd numbered subplurality of delay circuits and an even numbered subplurality of delay circuits alternately coupled in sequence to each other; and
a level converter receiving two input signals, generating an output signal and providing a characteristic between said output signal and a difference between said two input signals, said characteristic having an odd function being geometrically symmetric with respect to a crossing point of same level between said two input signals, one of said two input signals revealed to said output from one of said delay circuits of said odd numbered subplurality, the other one of said two input signals revealed to said output from one of said delay circuits of said even numbered subplurality.

12. A clock generator comprising:
a ring oscillator including a plurality of differential circuits alternating between odd numbered differential circuits and even numbered differential circuits coupled in a series, each differential circuit including a differential output transferring a signal to a differential input of a next differential circuit; and
a level converter receiving two input signals, generating an output signal and providing a characteristic between said output signal and a difference between said two input signals, the characteristic having an odd function being geometrically symmetric with respect to a same-level crossing point between said two input signals, one of the two input signals revealed to the output from one of the differential circuits of the odd numbered differential circuits, the other one of the two input signals revealed to the output from one of the differential circuits of the even numbered differential circuits.

13. The clock generator according to claim 12, wherein a differential output of a last one of the differential circuits is transferred to a differential input of a first one of the plurality of differential circuits arranged in the series.

14. The clock generator according to claim 12, wherein the plurality of differential circuits provides an odd number of inversions of a signal in one pass through the plurality of differential circuits arranged in the series.

15. The clock generator according to claim 12, wherein the one of the differential circuits of the odd numbered differential circuits is sequentially adjacent to the one of the differential circuits of the even numbered differential circuits.

16. The clock generator according to claim 12, wherein a number of the circuits comprising the plurality of differential circuits is greater than two.

17. The clock generator according to claim 12, wherein the ring oscillator comprises a differential input pair of lines provided on said input of each delay circuit and a differential output pair of lines provided on said output of each said delay circuit, the differential output pair of lines provided on one circuit being cascadedly coupled to said differential input pair of lines provided on a next one of said circuits in said plurality of circuits.

18. The clock generator according to claim 17, wherein the one of said two input signals is revealed to one of said output pair of lines provided on said output from one of said differential circuits of the odd numbered differential circuits and the other one of the two input signals is revealed to one of the output pair of lines provided on said output from one of said differential circuits of even numbered differential circuits.

19. The clock generator according to claim 17, wherein the differential output pair of lines provided on the output of a last one of the differential circuits is cross-coupled to the differential input pair of lines provided on the input of the first circuit to arrange and configure to produce an odd number of inversions of a signal in one pass through the plurality of differential circuits.

20. The clock generator according to claim 17, wherein one of the two input signals is revealed to one of the differential output pair of lines provided on the output of a last differential circuit and the other one of the two input signals is revealed to the other one of the differential output pair of lines provided on the input of the first one of the differential circuits.

* * * * *